Jan. 2, 1962 W. W. SCOTT ET AL 3,015,184
BAIT BOX
Filed April 14, 1958 2 Sheets-Sheet 1

INVENTORS
WELLINGTON W. SCOTT
JOSEPH P. IRVINE
BY
ATTORNEYS

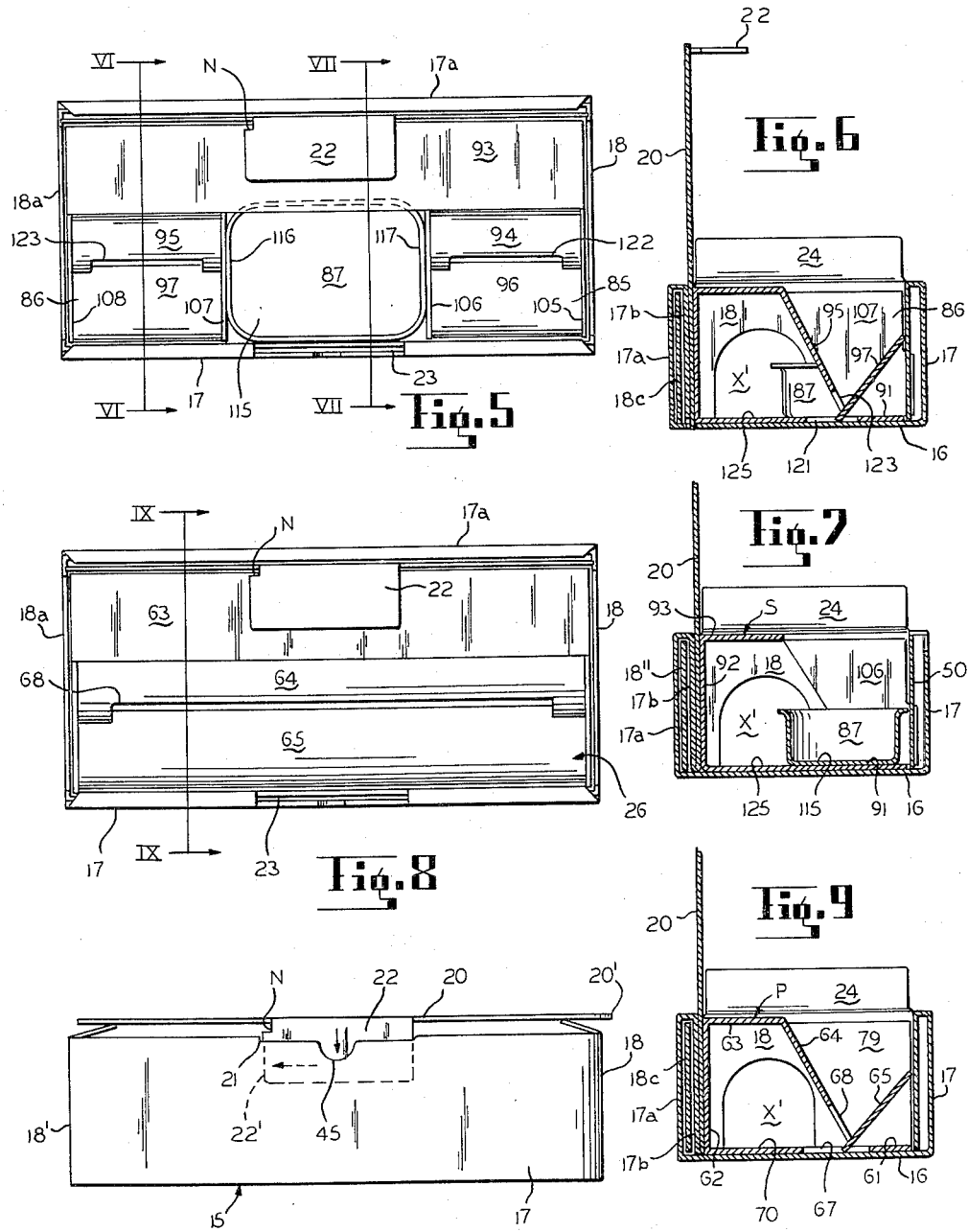

United States Patent Office 3,015,184
Patented Jan. 2, 1962

3,015,184
BAIT BOX
Wellington W. Scott and Joseph P. Irvine, Waukegan, Ill., assignors to Arwell Inc., Waukegan, Ill., a corporation of Illinois
Filed Apr. 14, 1958, Ser. No. 728,370
5 Claims. (Cl. 43—131)

The present invention relates to a new and improved type of rodent feeder for automatically dispensing rodenticidal compositions.

More particularly it relates to a new and improved, inexpensive and disposable type of rodent feeder for dispensing both dry, particularly rodenticides and wet, or liquid, rodenticides, and which is substantially tamper-proof.

Accordingly, an object of the instant invention is to provide a new and improved type of rodent feeder for dispensing such dangerous rodenticides for the extermination of rodents while protecting the lives of other animals.

Another object of this invention relates to foldable containers with removable inserts and more particularly, to improved containers and inserts which may be formed from a blank at a minimum expenditure of time and labor.

Another important object of this invention is to provide a strong and durable article that is inexpensive and disposable and which is so constructed as to be capable of withstanding the exacting usage to which articles of this kind are subjected during the extermination of rodents.

A further object of this invention consists in the novel means for maintaining the rodent feeder of a knockdown type box in proper position when the box is assembled.

Other objects and advantages of the instant invention will be apparent from the following discussion of annexed sheets of drawings.

FIGURE 5 is a top plan view of the instant rodent feeder with the cover in open position, and showing the interior hopper disclosed by FIGURE 3 and assembled in combination with a metal pan;

FIGURE 6 is a cross-sectional view taken along the line VI—VI of FIGURE 5 with the cover in open position;

FIGURE 7 is a cross-sectional view taken along the line VII—VII of FIGURE 5, a portion of the cover removed;

FIGURE 8 is a top plan view of the instant rodent feeder with the cover in open position and showing the interior hopper disclosed in FIGURE 2 and assembled therein;

Figures 1, 2, 3, 4:
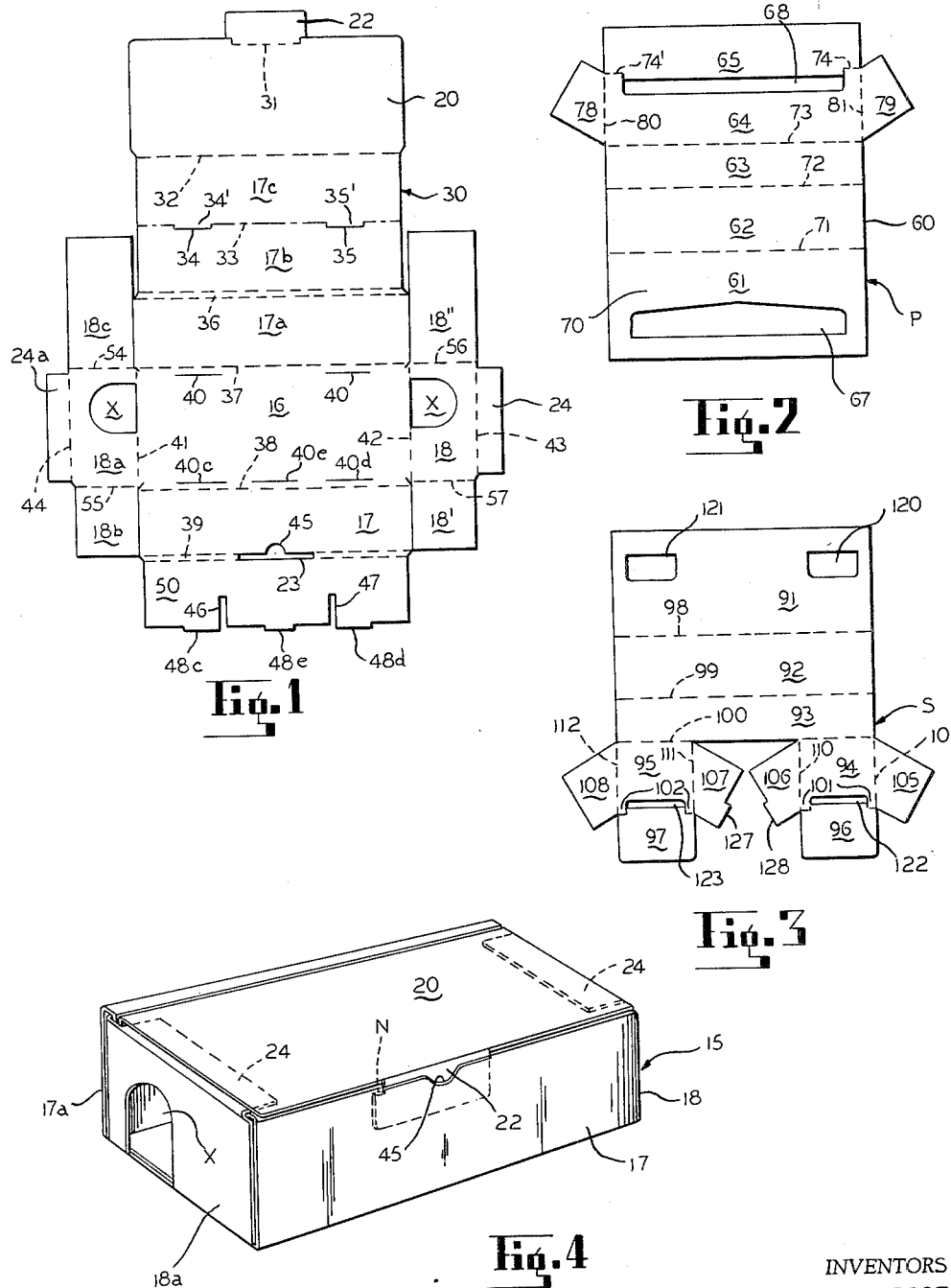
FIGURE 1 is a plan view of the box blank prior to the box being assembled.
FIGURE 2 is a plan view of one type of a scored interior hopper blank prior to the assembly thereof.
FIGURE 3 is a plan view of a further type of a scored interior hopper blank prior to the assembly thereof.
FIGURE 4 is a perspective view of the instant rodent feeder with cover in closed and locked position.

FIGURE 9 is a cross-sectional view taken along the line IX—IX of FIGURE 8, a portion of the cover removed; and FIGURE 10 is a side elevational view of the assembled box shown in FIGURE 4, with the cover slightly raised and moved to the right of its normal closed position, showing the locking tab partially inserted within the slit-like opening in the front wall of the box and further showing the pressure flaps extending from the ends of the box and exerting a resilient pressure upwardly on the bottom of the cover.

Similar reference characters refer to similar parts throughout the several views of the drawings.

The rodent feeder of the instant invention comprises of a generally box-shaped receptacle shown generally at 15 having a rectangular bottom portion 16, parallel opposed side walls 17 and 17A and parallel opposed end walls 18 and 18A. The end walls 18 and 18A have generally semi-circular openings or apertures X and X' therethrough for permitting the ingress and egress of rodents from the receptacle 15. The bottom portion 16 provides a flat surface for supporting the receptacle 15 upon any desired surface where it is desired to be placed. A cover member 20 is hingedly and integrally engaged to the top edge of one of the side walls 17A. When the cover 20 is in a closed position, the cover extends across the top of the receptacle and rests upon the top edge of the front wall 17.

A retaining or locking tab 22 is provided intermediate the ends of the cover 20 and on the free edge of the cover member 20 for locking the cover member 20 in a closed position. As may best be seen in FIGURES 1, 4, 5, 8 and 10 the locking tab 22 has a notch "N" in one end thereof juxtaposed the free edge of the cover member 20. A slit-like aperture 23 is provided in the top rolled edge of the front wall 17, later to be more fully described. The slit-like aperture 23 is of the same length along the top rolled edge of the front wall 17 as the length of the locking tab 22 upon the free edge of cover member 20, but arranged slightly to one side out of vertcial alignment with the tab 22 and in a horizontal direction away from the end wall 18'. By inserting the tab 22 into the aperture 23, the cover member 20 is forced in a horizontal direction so one end 20' thereof will extend beyond the end 18 of the receptacle as shown by FIGURE 10. After complete insertion of the tab 22 in a downwardly direction into the slit-like aperture 23 the notch N will coincide with the upper edge portion 21 of the front wall panel 17, the forward edge 22' of the tab 22 will move toward the end wall 18A whereby the lower portion of the notch N will become in locked engagement with said upper edge portion 21. In order to keep the cover member 20 in locked relation with the front wall 17 of the receptacle and prevent children or pets from accidentally opening the receptacle, pressure flaps 24 and 24A are provided on the top edges of the end walls 18 and 18A. When the cover member 20 is in a closed position with its locking tab 22 inserted in the slit-like aperture 23 in the top edge portion of the front wall 17 the pressure flaps 24 and 24A exert a resilient pressure upwardly on the bottom side and adjacent the ends of the cover member 20 and tend to urge it toward an open position. This resilient force against the bottom side of the cover 20 exerts a firm locking tension on the locking tab 22 inserted in the slit-like aperture 23 preventing the tab 22 and the lower edge portion 21 adjacent the notch "N" from disengagement from the aperture 23. This tight locking feature of the cover member 20 assures that the rodent feeder will be substantially tamper-proof; especially as regards to children and pets.

Although the rodent feeder may be formed from any type of material, for economic reasons it is preferable that it be produced from fiberboard or similar inexpensive material. As may be seen in the drawings the box-like receptacle 15 is preferably formed from a single sheet of fiberboard which has been properly cut, folded and secured into a box-like structure. The blank 30, shown by FIGURE 1, is made from a single piece of fiberboard, or the like. It comprises a cover 20 which has a tab 22, a rear wall 17A having an intermediate rear wall section 17B and an inner rear wall section 17C hingedly connected with each other. The end walls 18 and 18A have flaps, the end wall 18A has flaps 18B and 18C hingedly connected with the forward and rear ends thereof and the pressure flap 24A hingedly connected with the top fold edge thereof. End wall 18 has flaps 18' and 18" hingedly connected with the forward and rear ends thereof and the pressure flap 24 hingedly connected with the top fold edge thereof. The reference numerals 31, 32, 33, 36, 37, 38, 39, 41, 42, 43, 44, 54, 55, 56 and 57 designate respectively fold lines along which the blank can be indented or scored. The score line 33 is made with through-and-through cuts or slits 34 and 35 providing tabs 34' and 35' upon wall section 17C. Adjacent and parallel with the score line 37 is provided indentations 40 and 41 in alignment with tabs 34' and 35' arranged to receive said tabs 34' and 35' when the wall section 17C is folded and with the score line 33 in contact with the score line 37. Adjacent and parallel with the score line 38 is provided indentation 40C and 40E arranged in alignment to receive tabs 48C, 48D and 48E formed on the free edge of the inner section 50 of the front wall 17 hingedly connected together at fold line 39. The slit-like aperture 23 is provided between section 50 and wall 17 within the fold line 39; said slit-like aperture 23 having an arcuate opening 45 intermediate its ends and arranged to extend rearwardly from the fold line 39. The inner section 50 of the front wall 17 is provided with slits 46 and 47, their use to be explained later.

In order to assemble the receptacle from its collapsed condition, end wall 18A is bent along line 41, tab 18B is bent along line 55, tab 18C along line 54 and tab 24 is bent along line 44. The end wall 18 is bent along line 42, tab 18' along line 57, tab 18" along line 56 and tab 24 is bent along line 43. The front wall 17 is bent along line 38, section 50 thereof is bent along line 39 over and downwardly enclosing the end tabs 18B and 18' between the walls 50 and 17. The cover 20 is bent along the line 32, the inner wall section 17B is bent along fold lines 33 and 36 and arranged between the wall sections 17A and 17C. The end tabs 18C and 18" are folded along fold lines 54 and 56 respectively and arranged between wall sections 17A and 17B. The pressure flaps 24 and 24A are folded inwardly along lines 43 and 41 respectively for contacting the inner surface of the cover member 20 when it is folded to close the receptacle; the locking tab 22 being folded along fold line 31 for insertion into slit-like aperture 23 exposing the thumb or arcuate opening 45 adjacent the tab 22.

The means within the receptacle 15 for dispensing dry, particulated rodenticidal compositions preferably comprises an insert "P" formed from a single sheet of fiberboard or similar material which has been shown by FIGURES 2, 8 and 9. The blank from which insert "P" is formed is shown by FIGURE 2. The blank 60 comprises a bottom section 61 superimposed on and overlying the rectangular bottom portion 16 of the box-shaped receptacle 15, and a generally wedge-shaped self-feeding hopper shown generally at 26, FIGURE 8, for the automatic gravitational dispensing of a dry, particulated rodenticide. This wedge-shaped hopper extends the entire length of the box-shaped receptacle 15 and comprises opposed angularly disposed front wall 65 and rear wall 64. An aperture 67 is provided in the rectangular bottom section 61 of the insert "P" to collect the rodenticidal composition deposited therein and forming the feeding trough. The rear wall 62 of the insert is bent along fold lines 71 and 72 and is integrally connected between the bottom section 61 and the top section 63. The angularly disposed wall 64 is bent downwardly along fold line 73, and the upwardly and angularly disposed wall 65 is folded along lines 74 and 74'. A dispensing aperture 68 is provided along the lower edge portion of the angularly disposed wall 64. Flaps 78 and 79 are provided at the ends of the angularly disposed wall 64 and are bent upwardly along fold lines 80 and 81 to provide end portions for the hopper 26. The angular displacement and shape of the hopper 26 causes gravitational flow of the rodenticidal composition to the aperture 68. When the hopper is substantially full the frictional resistance offered by the particulated rodenticide collected at the aperture 68 and in the feeding trough 67 will prevent excess amounts of rodenticide from being introduced onto the floor portion 70 at the rear of the trough which is used as a runway by the rodents. However, as the rodenticide is removed from the trough or consumed by the rats or mice the rodenticide will work its way down the hopper under the influence of gravity to the aperture 68, thereby always presenting an ample supply of rodenticidal mixture for consumption by rodents.

As shown by FIGURES 5, 6 and 7 a modified form of a pair of hoppers 85 and 86 is shown for holding and dispensing dry, particulated rodenticidal compositions in combination with a metal pan 87 for dispensing a wet rodenticidal composition, the hoppers formed from a single blank as shown by FIGURE 3. This insert "S" comprises a floor section 91, a rear wall section 92, top wall section 93, a pair of rear and front angularly disposed walls 94, 95, 96 and 97 secured in the single sheet of fiberboard and folded along score lines 98, 99, 100, 101 and 102 formed therein. Flaps 105, 106, 107 and 108 are provided along the side edges of the walls 94 and 95 and folded along score lines 109, 110, 111 and 112 to form end portions for the hoppers 85 and 86.

The container for the wet rodenticidal composition is preferably formed from an inexpensive, non-corrosive metal such as galvanized sheet iron, to provide a metal pan 87. However, if desired plastic or other suitable pans can be used. The pan 87 comprises a generally rectangular shaped container with rounded corners. The bottom 115 of the pan is usually arranged upon the bottom 91 of the insert "S," with its end walls 116 and 117 wedged between flaps 107 and 106, the flaps hold the pan 87 in place while the end walls 116 and 117 of the pan keep the flaps 107 and 106 in tight engagement with the angularly disposed walls 94, 95, 96 and 97 to form tight end closures for the hoppers 85 and 86. The tabs 106 and 107 of the insert "S" are each provided with extension portions 127 and 128 respectively along their free edges. When the insert "S" is assembled within the box 15, the extension 127 fits into slot 46 and extension 107 fits into slot 47 formed in the inner section 50 of the box to further assist in giving rigidity to the entire rodent feeder. Insert "S" embodies a pair of apertures 120 and 121 in the floor section 91 to collect the dry rodenticidal composition deposited therein and form a pair of feeding troughs. A pair of dispensing apertures 122 and 123 is provided along the lower edge portion of the angularly disposed walls 94 and 95. The angular displacement and shape of the hoppers 94 and 95 causes gravitational flow of the rodenticidal composition to the apertures 122 and 123 and into the feeding troughs, the troughs prevent excess amounts of the rodenticide from being introduced onto the floor portion 125 adjacent the troughs which is used as the runway by the rodents.

From the above description of the inserts "P" and "S" it is clearly seen that either insert may be inserted within the receptacle 15. One insert may be more satisfactory than the other. If only dry rodenticidal composition is to be used, either insert may be used. When the wet type rodenticidal is desired the insert "S" should always be used.

The rodent feeder of the instant invention is particularly adaptable to situations where rodenticidal compositions cannot be used openly or exposed, such as for example where small children or domestic pets are liable to consume or tamper with the same. By the instant invention both wet and dry rodenticides may be safely placed in open areas; the tight locking feature of the cover member 20 and pressure tabs 24 preventing or discouraging small children or pets from tampering with the rodent feeder.

The outer surface of the cover member 20 may advantageously carry a legend or warning describing the poisonous contents of the receptacle. Accordingly, persons who are mature enough to easily disengage the locking tab 22 would also be capable of understanding and appreciating the poisonous nature of the contents of the feeder from the warning legend printed on the top thereof.

The rodent feeder of the instant invention provides a strong and durable box which can be shipped with the bottom, side walls and top and its insert in a flat compact arrangement thereof, the knockdown box capable of being properly assembled with ease and accuracy at the place of usage.

Since the instant rodent feeder is preferably formed from fiberboard or a similar inexpensive material, cleaning and maintaining of same is no problem. That is, when the feeder has served its exterminating purposes or has reached a point where cleaning is necessary, it may be easily disposed of by burning or the like. If formed of metal or similar material this practice would, of course, be financially prohibited.

It would be appreciated by those skilled in the art that we have now provided a new and novel disposable rodent feeder for the dispensing of both dry and liquid rodenticidal compositions. It will also be appreciated by those skilled in the art that various modifications and changes may be effected without departing from the novel scope of the present invention.

We claim as our invention:

1. A disposable rodent feeder comprising a generally box-shaped receptacle and a hopper in said receptacle for gravitationally dispensing particulated rodenticidal composition, said receptacle including a bottom portion, parallel opposed side and end walls and a cover member, said hopper being formed from a unitary blank and having a base engaging the bottom of said receptacle, a wall engaging one wall of said receptacle, a section extending from said wall in spaced parallel relationship to said base, a downwardly inclined section and an upwardly inclined section engaging another wall of said receptacle to provide a V-construction, said downwardly inclined section having a recess for feeding the particulated matter to said base and said receptacle having entrance openings below said spaced parallel section in back of said V-shaped construction, said receptacle having a double ply front wall with the inner ply defining a plurality of slots, said V-shaped construction having a bipartite formation affording spaced dispensing hopper elements with inner and outer end walls for each of the V-shaped hopper elements, the inner end walls thereof carrying tabs engaging in said slots in said inner ply wall to rigidify the receptacle structure.

2. A disposable rodent feeder comprising a generally box-shaped receptacle and a hopper in said receptacle for gravitationally dispensing particulated rodenticidal composition, said receptacle including a bottom portion, parallel opposed side and end walls and a cover member, said hopper being formed from a unitary blank and having a base engaging the bottom of said receptacle, said base forming a trough in cooperation with the bottom of said receptacle wall engaging one wall of said receptacle, a section extending from said wall in spaced parallel relationship to said base, a downwardly inclined section and an upwardly inclined section engaging another wall of said receptacle to provide a V-construction, said downwardly inclined section having a recess for feeding the particulated matter into said trough and said receptacle having entrance openings below said spaced parallel section in back of said V-shaped construction, said receptacle having a double ply front wall with the inner ply defining a plurality of slots, said V-shaped construction having a bipartite formation afford spaced dispensing hopper elements with inner and outer end walls for each of the V-shaped hopper elements, the inner end walls thereof carrying tabs engaging in said slots in said inner ply wall to rigidify the receptacle structure, and a metal trough positioned between the spaced hopper sections and pressing against said inner end walls thereof to further rigidify said structure.

3. A disposable rodent feeder comprising a generally box-shape receptacle formed from a single blank of material and having opposed side walls and a cover member, a double ply front wall with the inner ply having bottom tab extensions and a triple ply rear wall with the innermost ply thereof carrying bottom tab extensions, a bottom wall, there being slots in said bottom wall for receiving said tab extensions of said front wall and said rear wall to maintain the structure in firmly assembled condition, the inner ply of said front wall defining spaced slots, and a hopper comprising a base resting on the bottom wall of said receptacle, a rear wall engaging the rear wall of said receptacle, a top section extending from said rear wall of said hopper over the base thereof, a downwardly and forwardly inclined section and upwardly inclined section engaging said front wall, said upwardly inclined section being cut out to form two spaced V-shaped hopper elements having inner and outer end walls, the inner end walls thereof carrying tabs engaging the slots in said inner ply of said front wall.

4. A disposable rodent feeder comprising a generally box-shaped receptacle and a hopper in said receptacle for gravitationally displacing particulated rodenticidal composition, said receptacle including a bottom portion, parallel opposed side and end walls and a cover member, said hopper having a downwardly inclined section, an upwardly inclined section for engaging a wall of said receptacle to provide a V-shaped construction, said downwardly inclined section having a recess for feeding the particulated matter to said bottom portion, and a section extending from said downwardly inclined section in spaced parallel relation to said bottom portion, said receptacle having entrance openings below said spaced parallel section and to one side of said V-shaped construction, at least one of said walls having a triple ply construction with the innermost ply thereof carrying a bottom tab extension, said bottom portion of said receptacle defining a slot receiving said tab extension.

5. A disposable rodent feeder comprising a generally box-shaped receptacle and a hopper in said receptacle for gravitationally displacing particulated rodenticidal composition, said receptacle including a bottom portion, parallel opposed side and end walls and a cover member, said hopper having a downwardly inclined section, an upwardly inclined section for engaging a wall of said receptacle to provide a V-shaped construction, said downwardly inclined section having a recess for feeding the particulated matter to said bottom portion, and a section extending from said downwardly inclined section in spaced parallel relation to said bottom portion, said receptacle having entrance openings below said spaced parallel section and to one side of said V-shaped construction, at least one of said walls having a triple ply construction with the innermost ply thereof carrying a bottom tab extension, said bottom portion of said receptacle defining a slot receiving said tab extension, said upwardly inclined section being cut out to form to V-shaped hopper elements having inner and outer end walls.

References Cited in the file of this patent

UNITED STATES PATENTS

| | | |
|---|---|---|
| 610,255 | Bisler | Sept. 6, 1898 |
| 816,124 | Reynolds | Mar. 27, 1906 |
| 1,157,298 | Dague | Oct. 19, 1915 |
| 1,842,755 | Hill | Jan. 26, 1932 |
| 2,364,267 | Buttery | Dec. 5, 1944 |
| 2,398,797 | Meyer et al. | Apr. 23, 1946 |
| 2,651,450 | Ellsworth | Sept. 8, 1953 |
| 2,763,093 | Scott et al. | Sept. 18, 1956 |
| 2,856,114 | Guyer | Oct. 14, 1958 |
| 2,913,162 | Goltz | Nov. 17, 1959 |